United States Patent Office 3,425,629
Patented Feb. 4, 1969

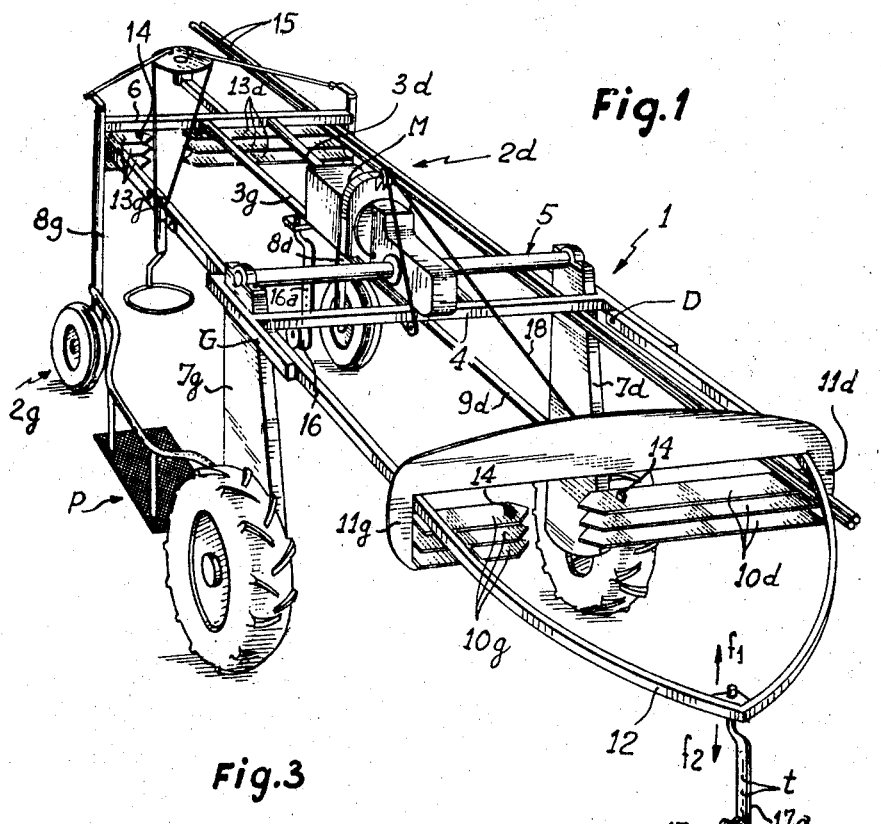
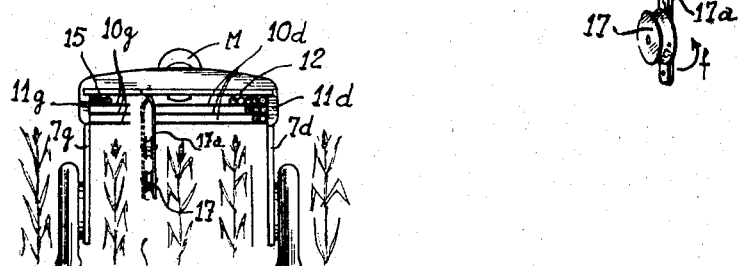
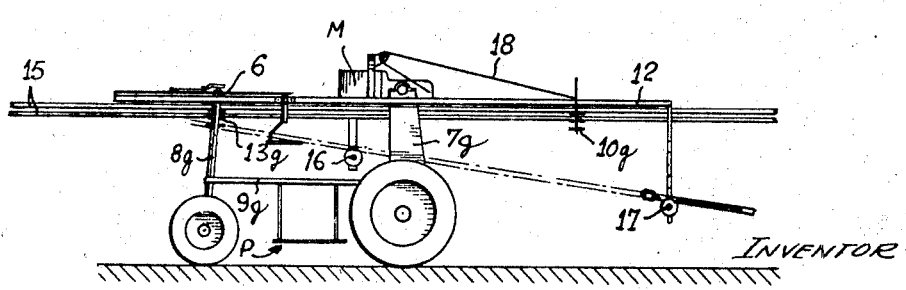

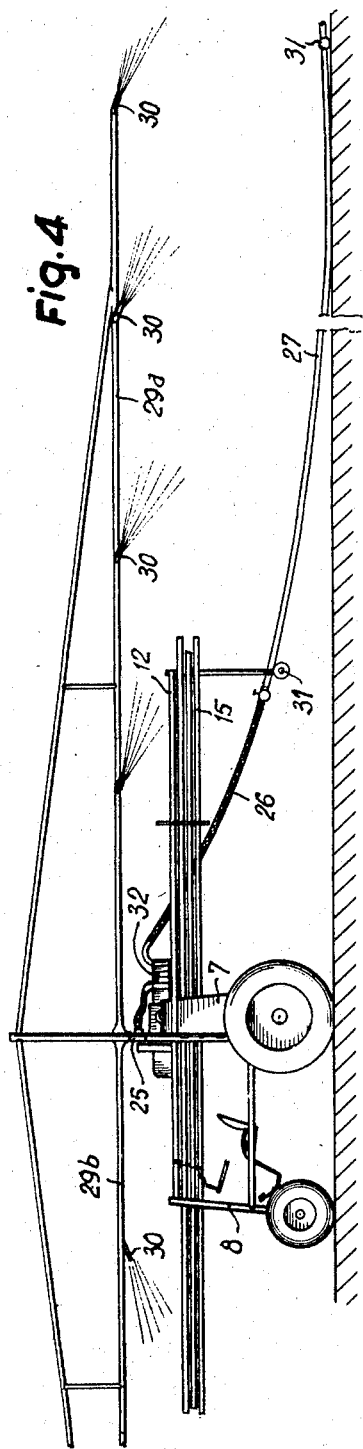
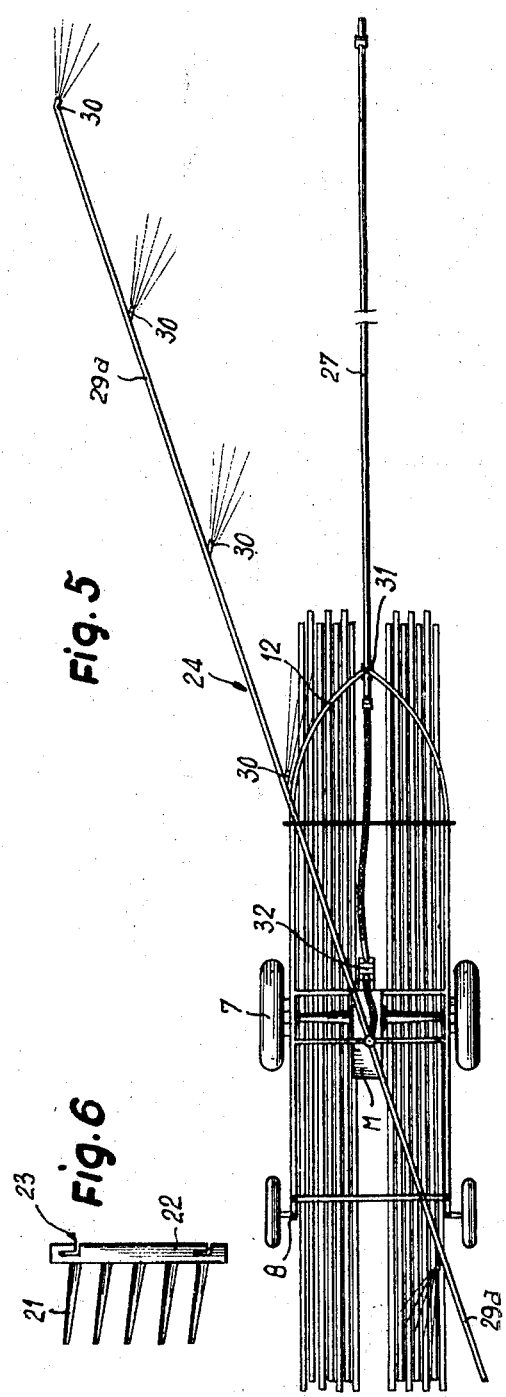

3,425,629
OVERLAPPING TRACTOR FITTED WITH AN OVERHANGING MAGAZINE FOR LOADS, ALLOWING A BALANCED DISTRIBUTION OF THESE LOADS
Emile Bobard, 17 Rue du Rion, Beaune, Cote d'Or, France
Filed Feb. 25, 1966, Ser. No. 529,987
U.S. Cl. 239—178                 10 Claims
Int. Cl. B05b *3/00;* B60p *1/00, 3/30*

ABSTRACT OF THE DISCLOSURE

A mobile pipe handling tractor is described for a use in laying or picking up irrigation pipes in a field. The tractor is constructed to carry a load of pipes or flexible hose on a plurality of support bars so that pipes can be lowered to or picked up from the earth over which the tractor is operated. In addition, the tractor may be provided with a sprinkler device which can be coupled to irrigation pipes in a field so that water can be distributed at any desired location of the tractor.

---

The present invention concerns an overlapping tractor fitted with a magazine for loads meant for rapid manipulation successively and one by one, along the course of said tractor, particularly in a dividing lane between relatively high plantations.

It aims, more particularly, at an overlapping tractor fitted with means enabling the conveyance and employment, by a single operator, of pipes of great length and of irrigation devices.

The applicant has ascertained that the magazines fitted underneath the chassis floors of overlapping tractors for the lengthwise storage of sprinkling pipes give occasion to loading and unloading operations, lengthwise and by their ends, which are impractical and very tiring.

Moreover, the length, usually nine meters, of pipes thus arranged in overlapping bundles causes difficulties in revolving the tractor in narrow lanes of high plantations, such as corn, particularly when entering and leaving at the end of these lanes.

The applicant has likewise ascertained that the storing spaces fitted above the chassis of overlapping tractors for the successive manipulation of irrigation pipes in lanes of plantations, on one of the sides and along the course of said tractor, are not sufficiently stable.

Actually such a magazine, filled completely with pipes, can be heavier than the tractor's motor; the position of the centre of gravity of this magazine varies therefore transversely, in successive stages, during the loading and unloading of pipes, one after the other, on the manipulation side of the tractor. The result is an aleatory distribution of the loads on each of the tractor wheels which may cause difficulties in operation and steering.

It has also been found that ordinary tractors fitted for the laying and stripping operations for irrigation and sprinkling systems can move forward properly only while stripping.

Moreover, the quantity of pipes being placed in these magazines of overlapping or ordinary tractors is often below the required quantity of pipes necessary for the irrigation of a plantation and which could be easily carried by the tractor.

The present invention has for its aim to put aside these disadvantages and to provide improvements to this technical area.

It concerns an overlapping tractor consisting of a platform-chassis integral with two lateral flanks and comprising a magazine fitted with load supports, placed at a level below the level of its platform.

According to the invention the load supports are open, at least laterally, to allow transversal manipulations of loads.

It will be perceived that by such an arrangement the loading and unloading of loads on the supports causes only minor transversal movements, not in any way connected with the movements imposed by longitudinal magazines, open at their ends.

Preferably, since the loads consist of pipes, the supports are fastened overhanging to the flanks of the tractor, the inner supports being favourably open and opposite each other, in a zone meant to travel above a dividing lane.

This device will obviously allow the maintenance of an equal distribution of the loads on both flanks of the tractor and the utmost reduction of the movements of pipes for a pipeline situated in the dividing lane underneath the magazine.

Preferably, the driving seat of the tractor is arranged as close as possible to the soil and essentially opposite the middle of the magazine length for the pipes.

Such a location will obviously cause reduced movements for the operator when manipulating the pipes which, moreover, will be perfectly balanced.

The invention concerns likewise an overlapping tractor fitted with a pipe magazine of the type mentioned above and with a sprinkling device which may be used by means of the pipe-system installed by the tractor.

Finally, the invention concerns a practical process allowing the economical laying or stripping of the pipes of an irrigation or sprinkling system in the lanes of a plantation.

Other characteristics of the invention will be seen from the subsequent description concerning the drawings on the attached sheet, both the description and the drawings being given exclusively as non-limitative examples.

On these drawings:

FIG. 1 represents in perspective an overlapping tractor according to the invention.

FIGS. 2 and 3 represent, respectively, in lateral and rear elevation the tractor of FIG. 1.

FIGS. 4 and 5 represent, respectively, in lateral and level elevation a tractor fitted with a sprinkling device.

FIG. 6 represents in elevation a pipe support which can be fitted to the tractors of FIGS. 1 and 4.

In the following description the similar parts placed to the right and the left of the median plane of the tractor will be indicated by the same number, followed respectively by the letters *d* and *g*.

On FIG. 1 can be seen a tractor consisting of a platform 1, or upper chassis, integral with two lateral flanks 2d, 2g.

Platform 1 comprises longitudinal beams 3d, 3g, connected to each other by cross-bars 4, 5 and 6.

Each flank 2 contains shanks of driving wheels 7 and of steering wheels 8, integral with a lower cross-bar 9. Cross-bar 9c is considerably bent backwards, as far as the outer face of the left flank; thus this flank provides a very clear space for a normal driving seat P which allows driving the tractor whilst standing or seated.

On platform 1 are arranged:

Steering gear for the forewheels,

A motor M, its gear-box and transmission gear, by means of the gears of shanks 7, to the driving wheels.

Furthermore:

Bars 10d, 10g are fastened parallel to cross-bar 4, underneath each other, to uprights 11g, 11d integral with a stirrup 12 joined at G, D to the longitudinal beams of the platform and, Bars 13d, 13g are fastened underneath each other, parallel to cross-bar 6, to shanks 8.

It will be seen that the uprights 11 are fitted to the arms of the stirrup by means of collars which allow adjustment of the longitudinal movement of bars 10 and 13 and that pins 14 are driven into appropriate holes in these bars to retain pipes 15, placed longitudinally on these bars.

Besides, grooved rollers 16, 17 are fitted to rods 16a, 17a hung respectively from upper beam 3g and stirrup 12; these rods, arranged to pivot around themselves, allow the rapid moving of their rollers opposite one or the other flank of the tractor (arrow f) and of holes t arranged on rods 16a, 17a, allowing the keying of these collars at various levels.

Finally, the articulation G D of stirrup 12 and a cordage 18 engaged, when reversed upon a winch allow adjustment of the position of the stirrup with reference to the chassis; the stirrup can be raised (arrow f1) or lowered (arrow f2).

These parts will be found again in FIGURES 2 and 3 and it will be noted that:

For each flank 2; to each bar 10 a bar 13 corresponds, on a level essentially parallel to that of platform 1.

The ends of the bars of each group thus formed (FIGURE 3) are arranged, in opposite fashion, in a zone situated above a dividing lane of a plantation A.

The preceding description allows to explain how such a tractor may be utilized for the installation of a sprinkling system in a plantation or, inversely, to strip the pipes from it.

With the tractor employed in the lanes of a high plantation, over a distance corresponding to two pipe-lengths, one can actually in lane A (FIGURE 3) easily reach one of the pipes 15, discharge it from bars 10 and 13 and place it on rear roller 17 and make it roll backwards on this roller and then connect its rear end to the water outlet provided for the irrigation of the plantation.

Then, with the forward end of the pipe still resting on roller 17, a second pipe will be discharged from bars 10 and 13 and placed, sloping, on roller 16 and connected, without being lowered, to the first one.

The tractor will then be made to move forward until the second pipe rolling on the sloping support line between rollers 16 and 17 is at the point of leaving the latter.

These operations of discharge, of placing on the central roller, of coupling and of moving the tractor will be repeated successively for the other pipes.

At the end of each of these cycles of operations the rod of roller 17 can be made to pivot, followed by that of roller 16, to perform the next cycle on the other side of lane A; in this way the loads supported by the two flanks of the tractor will be balanced.

Reverse operations from those described above will obviously allow to load supports 10 and 13 with pipes from the irrigation system, being stripped and a single operator can easily perform these operations without tiring.

But, in this case roller 17 will be suspended in front of the tractor, for instance from cross-bar 6, to form with roller 16 an oblique line of support rising towards the rear.

The end of the first pipe to be stripped will be placed on forward roller 17, the tractor will be moved until the end of the second pipe is engaged by roller 17; the first pipe can then be debranched and placed on the supports of the magazine. These operations will be repeated up to the last pipe of the system.

It will be noted that these operations of laying and stripping cause the operator to make movements, reduced as much as possible, from the driving seat to roller 16, from the latter to roller 17 and back to the driving seat. Also, for the laying a driving seat fitted behind the rear wheels and for the stripping a second seat fitted in front of the front wheels could be used.

It will be found that the technique of laying and stripping systems consisting of sloping support of the pipes is well known, but that it is applied with standard agricultural tractors having a single driving seat which necessitates the performing of one of these groups of operations by forward movement and the other group of operations by backward movement.

Furthermore, it will be found that an overlapping tractor such as described above can easily be fitted with magazines for pipes of other types.

It will suffice to lengthen towards the soil uprights 11 and to fit these, as well as shanks 8, with devices (FIGURE 6) in the shape of a rack.

These latter comprise overhanging bars 21 fastened to flanges having a face preferably conjugated to a face of the uprights and/or the shanks by which it will be supported.

These flanges have fastening-grooves 23 of the buttonhole type, allowing rapid fitting and unfitting by means of engagement with studs with expanded heads, integral with the shanks.

Additionally, racks of this type could also be fitted to the external faces of shanks 7 and 8 of the tractor.

Furthermore, for the irrigation or sprinkling of plantations the systems so installed are usually provided with appropriate tools for these operations: branch pipes or pulverisers for instance.

But, to further reduce the labour needed for the installation of these systems, provisions have been made inside the framework of the invention to fit to the tractor chassis sprinkling devices of wide reach which can be fed from a supply installed in the plantation, as has been explained above.

On FIGURES 4 and 5, can be seen an overlapping tractor similar to the tractor of FIGURE 1 and fitted with a rotating sprinkler of a known type.

This sprinkler consists essentially of a pole 25, partially hollow and arranged for spinning in standard fashion, on parts integral with the tractor chassis; a mechanism being provided to ensure the supply of this pole with water by flexible hose 26 which can be connected to a pipeline 27 installed from pipes 15 as explained above.

This pole is extended upwards to allow the guying 28 of two sprinkling arms 29a, 29b, which are connected to it in the shape of a whirl; these arms are fitted, in several places, with appropriate pulverizers.

Thus, with the tractor stopped and perhaps protected by a tarpaulin or by a plastic cover, the driver can connect hose 26 with pipeline 27; thus a large area of the plantation can be sprayed and at the end of this operation the whirl can be stopped, the hose uncoupled from the pipeline, tape 31 being fitted to the joints of the pipes to stop the flow of the sprinkling water.

Pipeline 27 may then be lengthened by such length as is determined by the spraying reach of the whirl and the spraying operation repeated in a zone next to the first one.

To increase the reach of the whirl a pump 32 which can be connected to the power-outlet of motor M can be incorporated to advantage in the circuit of conduit 26, to increase the pressure of the water in the sprinkler.

Obviously sprinkling devices of other types could also be fitted to the chassis of the tractor and possibly contain, for their operation, parts for connection to the power outlet of the latter.

The present invention is of course not limited to the terms of the preceding description but includes on the contrary any of the variants possible for someone experienced in these matters.

Thus it will be understood that the word "load" should be understood in its widest sense; thus the loads could for instance consist of reels of flexible hose and the load supports of arms suspended beneath the platform elements, in zones meant for moving over plantation lanes.

The axis of these reels, fitted to the free ends of the supports, could be fitted with friction brakes and frictional feeding devices which could be put into action by an appropriate device, for instance the power outlet of the motor.

Thus, during the course of the unrolling of the hose from a reel, for laying a pipeline, or of the rolling up of hose on a reel after stripping a pipeline, the hose could be submitted by means of the friction device and in the course of the forward movement of the tractor to a slight tension favourable to the regularity of the operation.

I claim:

1. An overlapping tractor comprising, a platform chassis, two lateral flanks integral with said chassis, at least four downwardly extended shanks mounted on said flanks, wheels supported on the lower ends of said shanks, means for propelling the tractor through at least one of said wheels, means for steering said tractor through at least one other of said wheels, a driver's seat mounted on said chassis between said flanks and said wheels, a forward load support means mounted transversely between said flanks, a rearward load support means mounted transversely between said flanks, said rearward load support means including horizontally disposed support bars which are each mounted at one end on said rearward load support means so as to leave a free end at which a load may be received or discharged, said support bars being located substantially parallel to one another and below the level of said platform chassis, and means provided near or at the free ends of said support bars for retaining a load thereon.

2. An overlapping tractor according to claim 1 and characterised by said load support means having open areas for receiving and discharging loads, said open areas being aligned with each other in a zone meant for movement above a dividing lane in plantations.

3. An overlapping tractor according to claim 2 which carries loads consisting of pipes, and wherein the support means consists of transversal bars distributed in the lengthwise direction of the vehicle in groups having at least two bars, these groups being storied with reference to each other.

4. An overlapping tractor according to claim 3 characterised in that the groups of bars are arranged in relation to each other to present free ends which are spaced from one another to define said open areas, thereby permitting the manipulation of pipes in a zone between rows of plantings which are being straddled by said tractor.

5. An overlapping tractor according to claim 4 characterised in that the pipe supports consist of racks which can be fitted to the tractor.

6. An overlapping tractor according to claim 4 characterised in that the rear bars of the groups of two bars are fitted to a stirrup adjustable in height.

7. Overlapping tractor according to claim 1 characterised in that the driving seat is arranged as close as possible ot the soil.

8. An overlapping tractor according to claim 7 characterised in that the driving seat is arranged in one of the flanks which contains a lower cross-bar, bent backwards considerably towards the exterior face of the flank.

9. An overlapping tractor comprising, a platform chassis, two lateral flanks integral with said chassis, at least four downwardly extended shanks mounted on said flanks, wheels supported on the lower ends of said shanks, means for propelling the tractor through at least one of said wheels, means for steering said tractor through at least one other of said wheels, a driver's seat mounted on said chassis between said flanks and said wheel, a forward load support mounted transversely between said flanks, a rearward load support mounted transversely between said flanks, said rearward load support including horizontally disposed support bars which are each mounted at one end on said rearward load support so as to leave a free end at which a load may be received or discharged, said support bars being located substantially parallel to each other below the level of said platform chassis, means provided near or at the free ends of said support bars for retaining a load thereon, and further characterised in that the tractor is fitted with sprinkling devices.

10. An overlapping tractor according to claim 9 characterised in that the sprinkling device consists of a whirl which can be supplied by a pump connected to the power outlet of the tractor.

References Cited

UNITED STATES PATENTS

| | | | |
|---|---|---|---|
| 1,601,199 | 9/1926 | Clapper | 239—213 |
| 2,704,162 | 3/1955 | Johnson | 214—84 |
| 2,743,133 | 4/1956 | Badders | 239—168 |
| 2,780,376 | 2/1957 | Sanders | 214—519 |
| 2,811,388 | 10/1957 | Calkins | 239—269 |
| 3,034,668 | 5/1962 | Wicks | 214—84 |
| 3,246,848 | 4/1966 | Bowers | 239—212 |

EVERETT W. KIRBY, *Primary Examiner.*

U.S. Cl. X.R.

137—344; 214—83, 84, 519; 239—168, 177, 212, 266